3,313,156
MONITORING OF PEAK HEAT FLUX
Bernard P. Breen, South Pasadena, Calif., and George Burnet, Jr., Ames, Iowa, assignors to the United States of America as represented by the United States Atomic Energy Commission
Filed June 30, 1964, Ser. No. 379,413
5 Claims. (Cl. 73—343)

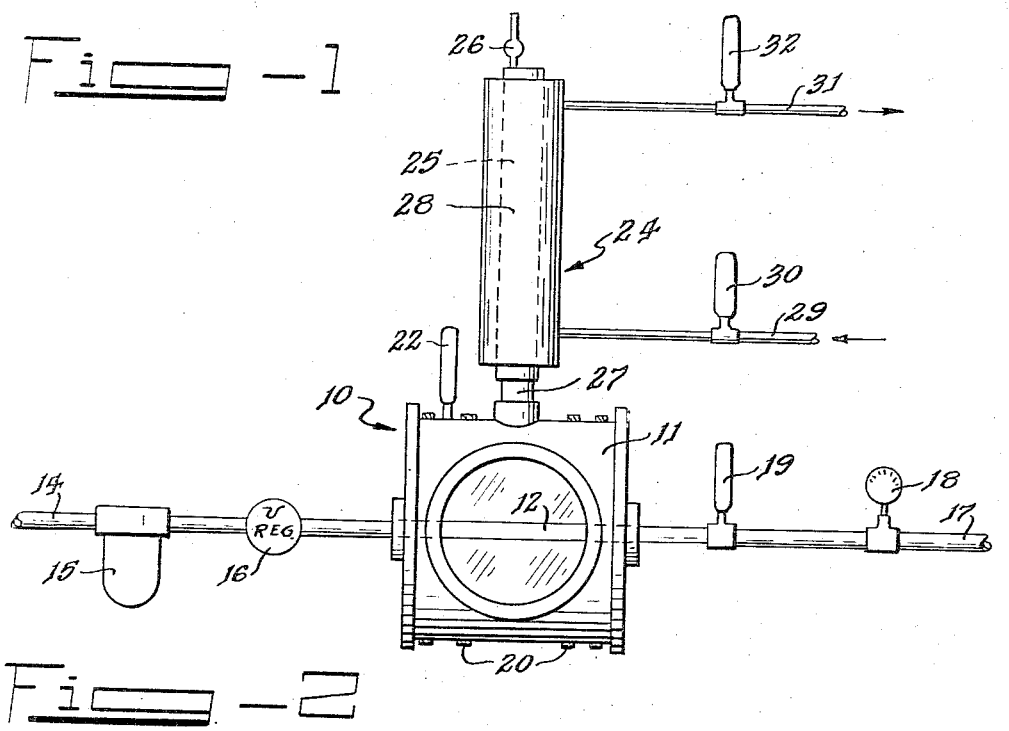
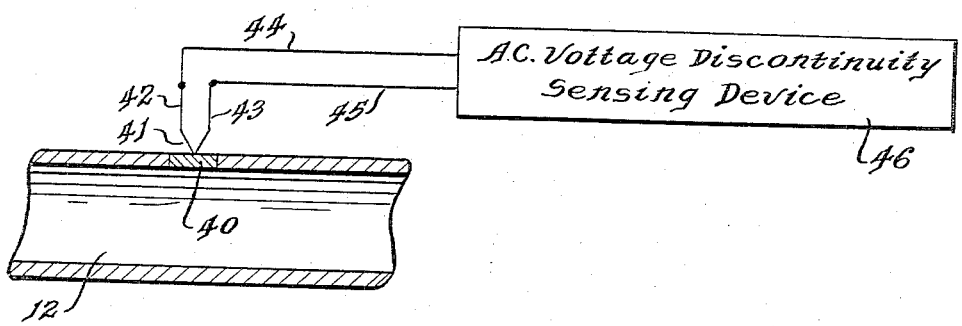
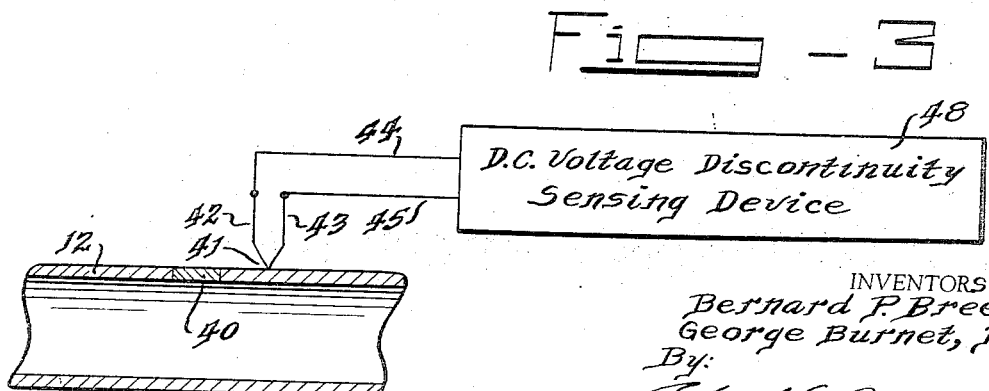

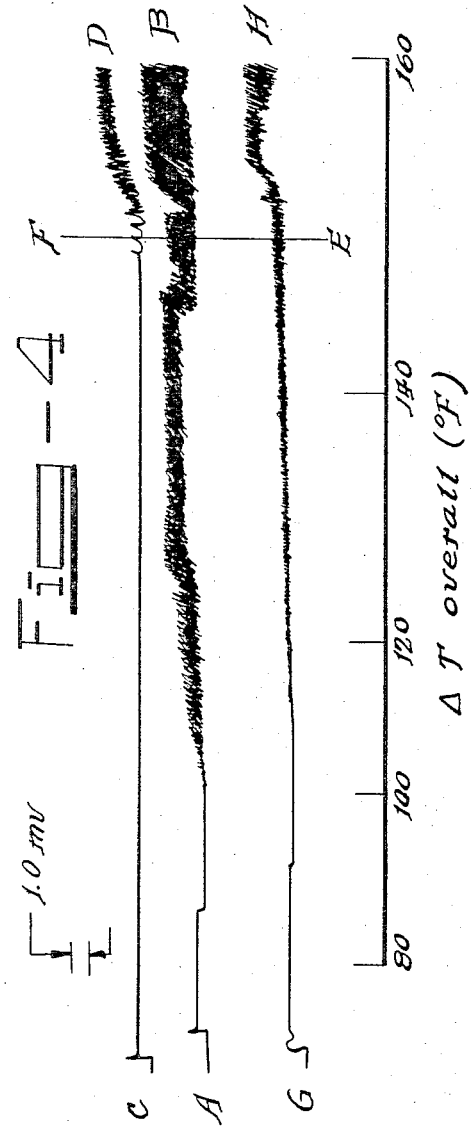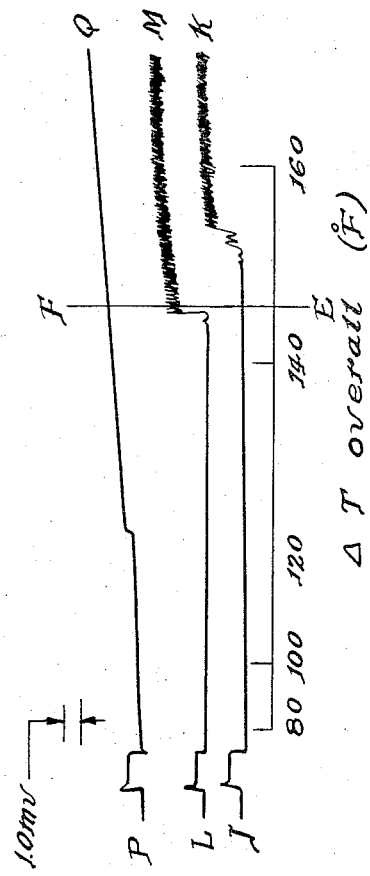

The invention relates to a novel method of monitoring the peak heat flux of boiling liquids and to a device therefor, more particularly to a method securing prompt, reproducible electrical signals adapted to control a boiling system.

The efficiency of boiling systems is dependent on their being operated as close as possible to maximum heat transfer per unit of heat exchange area, or peak heat flux; mathematically heat flux is expressed as $q/A$, $q$ representing quantity or number of units of heat transferred, and $A$ the area of the heat transfer surface, or as it is also called, the boiling surface. When a boiling system is operated below the temperature producing the maximum $q/A$, a much greater heat transfer area (a) is required to bring about the desired heat transfer, while operation above that temperature leads to fouling and even burnout of equipment. Of the two alternatives just mentioned, the second, of course, poses the more immediate danger, and hence it is customary to operate the systems well below maximum $q/A$, or peak heat flux, even though this entails a loss of efficiency and increased investment for larger equipment than would be necessary if the operation could be safely carried out closer to the peak.

Methods are known for monitoring the peak within limits. These are essentially calorimetric in character, based on the fact that the heat content of the steam or other gaseous boiling product is a function of the heat transferred within the boiler. Since the temperature of the gaseous product is normally constant at it leaves the boiling vessel, its volume is likewise a function of the heat transferred, which can then be determined by prompt volumetric or flow measurements. However, none of these methods are sufficiently precise to enable a boiling system to be operated without allowing a considerable margin of safety below the $q/A$ maximum, or peak heat flux, and this results in a serious loss of efficiency since in the raea which has to be set aside for the safety margin the $q/A$ is rising steeply toward the peak with the difference ($\Delta t$) between the temperature of the heat transfer surface and that of the liquid. (See W. H. McAdams, "Heat Transfer," 2nd ed., McGraw-Hill Book Company, New York, 1942, ch. X, especially graph of $q/A$, vs. $\Delta t$ on page 296.)

If, therefore, a more precise method of monitoring the approach of the peak heat flux could be discovered, it would not be merely a theoretical refinement over present methods, but one of great practical value since it would enable boiling systems to be operated within some, or even most, of this area of rapidly increasing $q/A$ that now has to be avoided for safety reasons. The substantial increase in efficiency which this would bring would make it possible to decrease the heat transfer area, or, in more practical terms, to reduce equipment size. This, in turn, would lead to lower capital investments for power plants or other installations where boiling is carried out on a large scale.

More sensitive methods of heat flux monitoring have been proposed from time to time, but so far have had only limited success. As is explained in the above-cited chapter X of the McAdams textbook on Heat Transfer, as well as in other literature in the field, boiling begins with the formation of small bubbles upon a submerged heat transfer surface, such as the surface of a tube. At this stage, which is known as nucleate, or nuclear, boiling heat transfer between the boiling surface and the liquid is favorably influenced by the substantial area of direct contact between the surface and the liquid, which has comparatively good heat conductance. As the temperature difference ($\Delta t$) between the boiling surface and the liquid rises, heat transfer rises sharply toward the $q/A$ maximum, due to thermodynamic driving force caused by the increased temperature difference. When, however, the bubbles become so numerous that they begin to merge with each other nucleate boiling comes to an end, and the heat insulative properties of the gases of the bubbles begin to interfere seriously with heat transfer. After passing through a comparatively brief intermediate stage known as transition boiling the liquid enters the final stage known as film boiling in which, as the name implies, the heat transfer surface is covered with a continuous, highly insulative layer of vapor. This leads to a rapid rise of surface temperature and of the $\Delta t$ value, causing the fouling and burnout above mentioned, as well as lowering the $q/A$ value away from the maximum as steeply, and sometimes even more steeply, than its rise toward it during the nucleate boiling phase.

Although these details of the phenomenon of boiling have been known for at least 30 years, all the attempts to improve on the calorimetric methods of monitoring an approaching $q/A$ maximum have had only limited success. Experimental boiling systems have been devised with arrays of heat sensing devices such as thermocouples located along the inner and outer sides of heating tubes, in various locations around the inner and outer circumference of the tubes, in the hope that from one or a combination of the sensings received from the devices a dependable monitoring signal could be derived. No matter how the number and locations of the sensing devices were varied none of these arrangements were able to give a signal denoting a heat flux peak until the peak had passed; this time lag, though small, detracted from the value of the signal as a means of activating a control system, and offered little improvement over calorimetric methods.

It is, accordingly, the general object of the invention to provide a method of monitoring the approach of a peak heat flux of a boiling liquid.

It is a more particular object to provide such a method which will be more precise than methods of such monitoring which are now known.

It is still a more particular object to provide a method of producing signals which can be used to activate a control mechanism for a boiling system with sufficient sensitivity to permit the system to be safely operated in areas closer to the peak heat flux than can be done with present methods of monitoring.

It is a further object to provide apparatus for carrying out the above methods.

Other objects will appear as the description proceeds.

The invention is based on the discovery that if a boiling surface is provided with a limited, or special, area of greater thermal conductivity than the rest of the surface, nucleate boiling will come to an end and transition boiling begin sooner on the special area than on the rest of the surface. Such an area can be provided in a number of ways, by removing a portion of the heating surface wall and substituting a more conductive insert of the same thickness as the wall, by drilling the wall to a limited depth and making the drilled area flush with the rest of the wall by an insert of greater conductivity, and even by treating the surface metallurgically during its manufacture to produce an area of limited, enhanced conductivity. Because of the many possible applications it is not possible to enumerate all the ways that could be adopted to provide the special area, nor all the materials; copper and silver could be used as inserts or alloying materials when the greatest possible contrast in thermal conductivity is desired, but as will be seen, this is not always desirable, and in such a case a material of lower conductivity would be preferable, such as nickel.

The region affected by the special area of greater conductivity is then provided with an electrical heat sensing device, such as a thermocouple, resistance thermometer and the like; when the device is placed directly on the special area the approach of a peak heat flux will be indicated by an oscillatory or A.C. component in the electrical output of the thermocouple, or other device, which may be visually observed on an oscilloscope, or led into an A.C. voltage discontinuity sensing circuit which will sense the A.C. oscillations and activate a control mechanism such as a relay to change one or more of the parameters of the boiling system such as the heat input, cooling water flow, pressure, and the like.

A different type of signal, and one permitting the use of simpler circuitry, may be derived by making the contrast in thermal conductivity between the special area and the rest of the heat transfer surface comparatively weak, as by using a nickel insert, and/or by locating the sensitive point of the sensing device, such as the junction of a thermocouple, at a short distance from the special area but within the region affected by the special area. With this arrangement the signal will be only very weakly oscillatory in character, but it will have a comparatively sharp single voltage discontinuity prior to the peak. This discontinuity can be sensed by a simple D.C. voltage discontinuity sensing circuit whose output, in turn, can be used as a signal to trip a relay or otherwise activate a control mechanism. By varying the linear distance of the heat sensing device from the special area on the boiling surface, the $\Delta t$ interval of the discontinuity from the peak $q/A$ may be controlled to any desired value.

Reference is now made to the drawings, FIG. 1 of which is a schematic view of apparatus used for experiments in connection with the invention.

FIG. 2 is a schematic, partly sectional view of one embodiment of the invention, related to the graph of FIG. 4.

FIG. 3 is a schematic, partly sectional view of another embodiment of the invention, related to the graph of FIG. 5.

FIG. 4 is a graph in which the abscissae are the temperature differences ($\Delta t$) between the boiling liquid, acetone, and the heating fluid, steam, running through a heat transfer tube 12 within the apparatus of FIG. 1. The ordinates are nonadditive, having no absolute values, but a value in millivolts within thermocouple circuits is indicated by the vertical spacing between two lines, designated by bent arrows, which is applicable to all voltage curves shown.

FIG. 5 is a graph of the same kind as FIG. 4, showing two additional voltage curves on a smaller scale.

Referring to FIG. 1, the numeral 10 designates the apparatus used for experiments in connection with the invention generally. It consists of a boiling cabinet or vessel 11, having a heat exchange or boiling tube 12 which is visible from the outside through window 13. A heating fluid supply line 14, in this case a steam line, supplies heat to the boiling tube 12 through steam trap 15 and pressure regulator 16. Heating fluid exit line 17 removes steam from boiling tube 12, and is provided with a pressure gage 18 and a thermometer 19 adapted to measure the temperature of the steam.

Boiling vessel 11 is wound around with heating tape 20, in order to preheat the boiling liquid, in this case acetone, which substantially fills the vessel 11. A thermometer 22 senses the temperature of the boiling liquid.

Above and communicating with the boiling vessel 11 is a water-cooled condenser shown generally by the numeral 24. It consists of an inner tube 25, having a moisture seal 26, and a constricted portion, or neck, 27, within which is a sieve plate (not shown). Tube 25 is surrounded through a major portion of its length by cooling jacket 28. Leading into cooling jacket 28 is cooling water inlet line 29, which is provided with a thermometer 30 adapted to measure the temperature of the incoming cooling water. Leading out of jacket 28 is cooling water outlet line 31, which is provided with thermometer 32 adapted to measure the temperature of the outgoing cooling water. It will be understood that the entire apparatus 10 is insulated from the ambient temperature by insulation (not shown) and that the thermometers may be of any suitable type including resistance thermometers and thermocouple thermometers as well as expansion types.

The purpose of condenser 24 and its components is to make determinations of the heat flux and its peak by calorimetric methods concurrently with measurements made by electrical means within the vessel 11. Since the system is insulated to prevent escape of heat to the environment the heat content of the gaseous product of the liquid boiling within vessel 11 is a function of the difference between the temperatures of the incoming and outgoing cooling water, the flow being constant. These temperatures may be recorded, preferably continuously, by thermometers 30 and 32, and from a graph of the difference between these recordings the heat flux may be quantitatively determined.

Reference is now made to FIG. 2 which shows one embodiment of the invention. Along the top of the wall of heat transfer tube 12 an insert 40 has been placed of markedly greater conductivity than that of the tube, such as brass, copper, silver and the like. In about the center of insert 40 is junction 41 of a thermocouple having legs 42 and 43 which are connected with lead wires 44 and 45 leading into a suitable means for utilizing the voltage variations from the thermocouple as a signal, such as the A.C. voltage discontinuity sensing circuit shown diagrammatically at 46. I have found that by varying the size and conductivity of insert 40 the end of nucleate boiling and the onset of transition boiling can be made to occur at varying times in advance of the same occurrence over the top of the rest of the wall of tube 12, the larger the insert and the greater its conductivity the farther in advance. This advance occurrence then sets up an A.C. component in the thermocouple circuit due to oscillations of the voltage; the output of the circuit can then be utilized as a control signal to regulate one or more parameters of the boiling system, such as by the circuit above described.

In FIG. 3 the insert 40 in tube 12 is made of a material of greater thermal conductivity than that of tube 12, but only moderately so, such as a nickel insert in a tube of stainless steel. This embodiment differs from the one in FIG. 2 in only two respects: the thermocouple junction 41 is on the top of the wall of tube 12 a short distance away from the insert 40 rather than upon it, and a D.C. voltage discontinuity sensing circuit 48 is used instead of an A.C. voltage discontinuity sensing circuit. I have found that with this arrangement that the voltage output of the thermocouple is only very slightly oscillatory in character preceding the attainment of peak heat flux, but that shortly before the peak the voltage undergoes an abrupt upward discontinuity that can be used as a control signal by a simple circuit adapted to sense D.C. voltage changes. The circuit need not be filtered to eliminate oscillations before the discontinuity, although this may be done if it is desired to eliminate them thereafter. However, it is not anticipated that this will be considered necessary since the oscillatory character of the thermocouple output subsequent to the discontinuity present no real disadvantage.

*Example I*

In an apparatus of the type shown in FIG. 1 a hole one-quarter of an inch in diameter was drilled in boiling tube 12 which was made of stainless steel. The hole was filled by a brass insert 40 having the same thickness as the wall of tube 12, and a conductivity of 60 B.t.u./° F. It was cemented in place by "Resiweld," an epoxy resin cement. The tube was then provided with a two-wire thermocouple with its junction over the center of the insert, and a one-wire thermocouple consisting of a constantan wire was welded to the top of the tube, the tube itself acting as the second leg of the one-wire thermocouple. The one-wire thermocouple was placed along the same longitudinal line as the two-wire thermocouple but a sufficient distance away that is measured the temperature of the outside of the tube wall without being influenced by the presence of the insert.

Tube 12 was then placed in the vessel 11 and sealed against leakage with the longitudinal line of the two thermocouples and the insert at the top. A fresh charge of acetone was placed in vessel 11. Heating tape 20 was activated to bring the acetone to its saturation temperature, 133° F., and steam having a pressure of 56 p.s.i.g. was introduced into the tube 12. The thermocouples were connected to a recorder having a moving strip of paper on which was recorded the voltage output of the two-wire thermocouple along the line, or tracing, AB of FIG. 4. Along the line CD of the same figure the output of the one-wire thermocouple is recorded. At the same time by well-known calorimetric methods, sensings of thermometers 22 and 30 were made to record the peak heat flux which is shown as the vertical line EF, and sensings from thermometers 19 and 22 indicated the over-all temperature difference, $\Delta t$, between the steam and the boiling liquid. The latter sensings are shown in ° F. as the abscissae along the bottom of the graphs of FIG. 4. The two spaced lines, indicated by the bent arrows, show the value of 1.0 mv. which is applicable to both lines AB and CD, the ordinates, as before explained, not being additive from one line of tracing to the next above it.

It will be noted that the tracing AB indicates that the output of the two-wire thermocouple took on an A.C. well-developed component in the form of oscillations at $\Delta t$ interval of 33° F. in advance of the peak heat flux, whereas the CD tracing lacked this component until after the peak, or at least it was not well developed until then. It will be understood that the tracings shown in FIGS. 4 and 5 are not reproduced photographically in the drawings, but as accurately as possible by hand methods.

*Example II*

The procedure of Example I was followed exactly, except that the brass insert had a diameter of ⅛ inch instead of ¼ inch as in that example. The tracing from the output of the two-wire thermocouple over this smaller insert is shown in the line GH in FIG. 4.

It will be noted that the votage output of the two-wire thermocouple took on its A.C. component somewhat closer to the peak line EF than was the case when the ¼ inch insert was used, as shown by the line AB. Thus a method has been provided for determining how close to the peak the appearance of the A.C. component shall be, simply by varying the size of the insert. As will be seen later, varying the conductivity of the insert can also be used to the same end.

*Example III*

The procedure of the previous examples was repeated except that in place of brass insert 40, a one-inch nickel cylinder was made a part of tube 12, and the two-wire thermocouple was placed ⅜ of an inch away from it along the top of the tube. The one-wire thermocouple on the inside of the tube was omitted, and a tracing made on the recorder strip of the voltage output of the one-wire thermocouple on the outside of the tube. This is the line JK of FIG. 5; the line LM represents the tracing of the output of the two-wire thermocouple ⅜ inch from the nickel ring.

It will be observed that the line LM shows a distinct upward discontinuity shortly before the line EF, indicating the peak heat flux, whereas the discontinuity in the line JK, coming from the one-wire thermocouple outside the region affected by the insert, fails to show any discontinuity until later.

*Example IV*

The procedure of the previous examples was repeated except that instead of using a circular insert a short part of the mid-length of tube 12 was removed and replaced by a similar length of nickel tubing. A thermocouple was attached to the inside of the nickel surface and a tracing made as shown by the line PQ in FIG. 5. It will be noted that this tracing shows a small, but well defined, discontinuity well in advance of the peak heat flux line EF.

This gives still another method of regulating the length of the $\Delta t$ interval between the signal and the peak heat flux; namely, by orienting the thermocouple away from the region of maximum vapor formation on the heating surface, which, in the case of a boiling tube, is along its top.

It will be understood that the invention is not to be limited to the details given herein but that it may be modified within the scope of the appended claims.

The embodiments of the invention in which an exclusive property or privilege is claimed are defined as follows:

1. A boiling system apparatus comprising a heat transfer wall, a means forming a limited portion of said wall having greater thermal conductivity than the rest of the wall, said portion being responsible for an earlier termination of nucleate boiling and onset of transition boiling in a region surrounding said limited portion, and temperature sensing means within the said region on the low temperature side of said wall.

2. The apparatus of claim 1 where the temperature sensing means is in contact with said limited portion.

3. The apparatus of claim 1 where the temperature sensing means is in contact with said wall within the said region but outside the said limited portion.

4. The apparatus of claim 1 where the temperature sensing means is a thermocouple in contact with said limited portion, means for monitoring discontinuity of the alternating current component of the voltage output of the thermocouple and electrical connection therebetween, the junction of the thermocouple making the said contact.

5. The apparatus of claim 1 where the temperature sensing means is a thermocouple in contact with said wall within said region but outside said limited portion, means for monitoring voltage discontinuity of the direct current component of the voltage output of the thermocouple and electrical connection therebetween, the junction of the thermocouple making the said contact.

References Cited by the Examiner

UNITED STATES PATENTS

| 1,308,040 | 7/1919 | Chubb | 126—344 |
| 3,056,587 | 10/1962 | Steigerwald | 126—344 |

RICHARD C. QUEISSER, *Primary Examiner.*

JACK C. GOLDSTEIN, *Assistant Examiner.*